United States Patent [19]

Ramsey

[11] Patent Number: 5,113,885
[45] Date of Patent: May 19, 1992

[54] PIPE CLEANING APPARATUS

[76] Inventor: Donald G. Ramsey, 962 Cornell Ave., Youngstown, Ohio

[21] Appl. No.: 692,705

[22] Filed: Apr. 29, 1991

[51] Int. Cl.$^5$ ............................................ B08B 9/04
[52] U.S. Cl. ................... 134/167 C; 118/306
[58] Field of Search ............... 134/167 C, 168 C; 118/306, DIG. 10; 15/104.31

[56] References Cited

U.S. PATENT DOCUMENTS

| | | |
|---|---|---|
| 1,147,237 | 7/1915 | Hauer . |
| 1,596,065 | 8/1926 | Muller . |
| 2,461,517 | 2/1949 | Carnevale ............... 118/306 |
| 2,579,813 | 12/1951 | Frank . |
| 3,078,823 | 2/1963 | Cummings et al. .......... 118/306 |
| 3,262,143 | 7/1966 | Reinhart . |
| 3,987,963 | 10/1976 | Pacht ..................... 118/306 X |
| 4,690,159 | 9/1987 | Vadakin et al. ............ 134/167 C |
| 4,777,905 | 10/1988 | Lona ...................... 118/306 X |

FOREIGN PATENT DOCUMENTS

| | | | |
|---|---|---|---|
| 1298764 | 6/1962 | France ................ 15/104.31 |
| 263443 | 6/1968 | U.S.S.R. ............... 118/306 |
| 379295 | 7/1973 | U.S.S.R. ............... 134/167 C |

*Primary Examiner*—Philip R. Coe
*Attorney, Agent, or Firm*—Harpman & Harpman

[57] ABSTRACT

An improvement in a pipe cleaning apparatus for cleaning pipe lines of accumulated deposit utilizing high pressure fluid disbursing nozzles carried on a movable platform. The improvement is directed to the platform which has multiple guide and spacing elements allowing the cleaning apparatus to transverse arcuate curves within the pipe line while maintaining proper alignment of the fluid dispensing nozzles.

4 Claims, 2 Drawing Sheets

PIPE CLEANING APPARATUS

BACKGROUND OF THE INVENTION

1. Technical Field

This device relates to pipe cleaning devices that travel through the interior of a pipeline, cleaning the interior surface as they go. These types of devices use abrasive heads in direct contact with the surface to be cleaned and are usually pulled through the pipe by auxilliary means.

2. Description of Prior Art

Prior Art devices of this type have relied on a variety of different guide and support structures to position abrasive elements properly within the pipeline, see for example U.S. Pat. Nos. 3,262,143, 2,579,813, 1,596,065 and 1,147,237.

In U.S. Pat. No. 3,262,143 a propulsion unit for a descaling apparatus is disclosed that uses multiple guide wheels, each carried by a support arm on a central pivot. Scraper elements are radially positioned from a central support tube for engagement with the interior of a pipe.

U.S. Pat. No. 2,579,813 discloses an apparatus for cleaning pipes using pivoted support arms having a guide wheel positioned thereon and a spring-loaded socket angularly positioned on a support body member to urge the pivoting arm supporting against the interior of a pipe.

In U.S. Pat No. 1,596,065 tube scraper is disclosed wherein a plurality of radially positioned spring-urged rollers position and guide the tube scraper through the interior of the pipe. Each of the rollers has a biased spring transversely engaging the roller support arm.

U.S. Pat No. 1,147,237 shows a tube cleaning apparatus that has a series of spring-loaded guide studs that position the device within the tube.

SUMMARY OF THE INVENTION

An improvement in a pipe cleaning apparatus used to clean the interior surface of a pipeline removing built-up deposits that normally accumulate during use. The improved guide and support arm assembly is used to position multiple cleaning nozzles within the pipe and to provide proper tracking through curved pipe sections. The improved guide and support assembly has multiple pairs of pre-space engagement wheels extending from a single resilient guide arm.

DESCRIPTION OF THE DRWAINGS

FIG. 1 is a partial cross-sectional view of the device;
FIG. 2 is a cross-section on lines 2—2 of FIG. 1;
FIG. 3 is an end plan view on lines 3—3 of FIG. 1;
FIG. 4 is an enlarged end view of a portion broken away showing a wheel assembly within a pipe;
FIG. 5 is an enlarged top plan view of a portion broken away showing a wheel support part; and
FIG. 6 is an enlarged side plan view of a wheel assembly engaging a pipe.

DESCRIPTION OF THE PREFERRED EMBODIMENT

Figure 1:
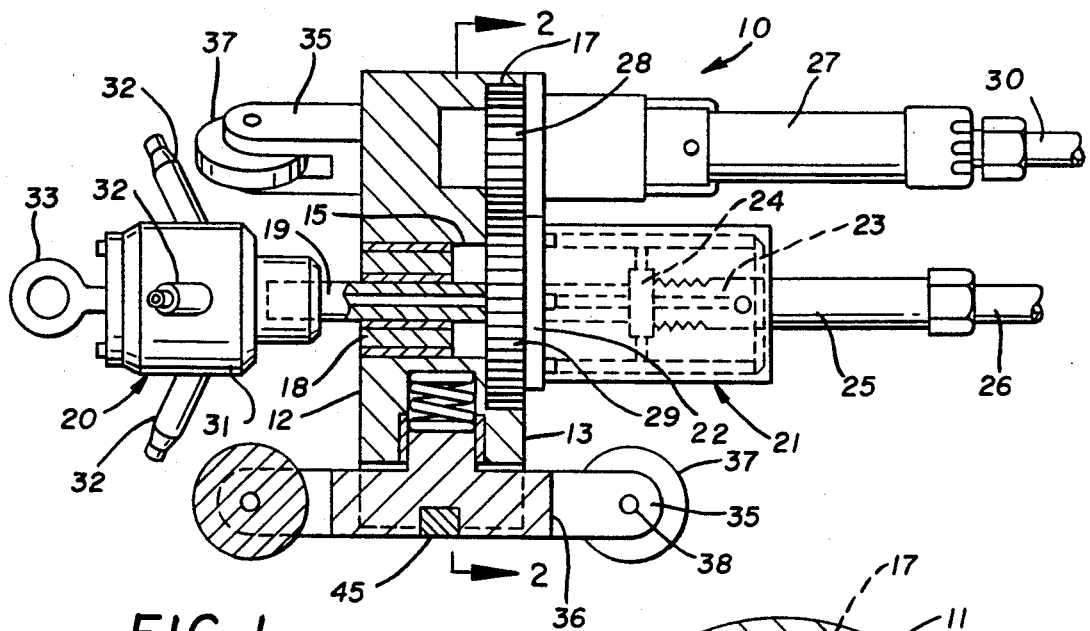
Figure 2:
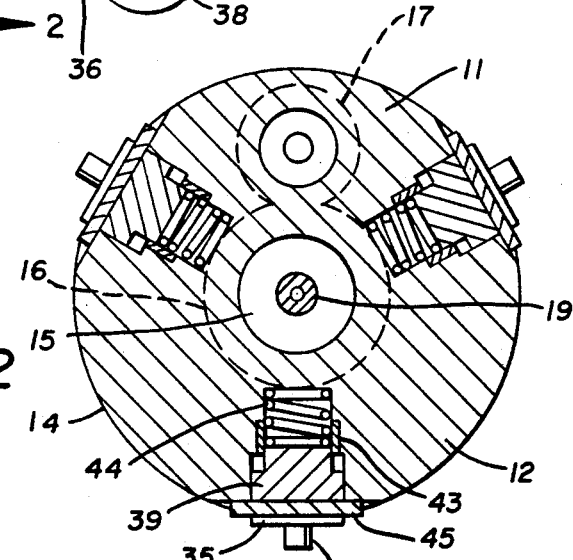
Figure 3:
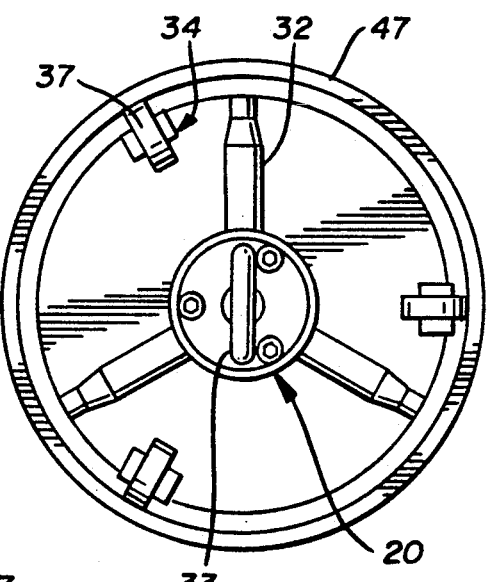
Figure 4:
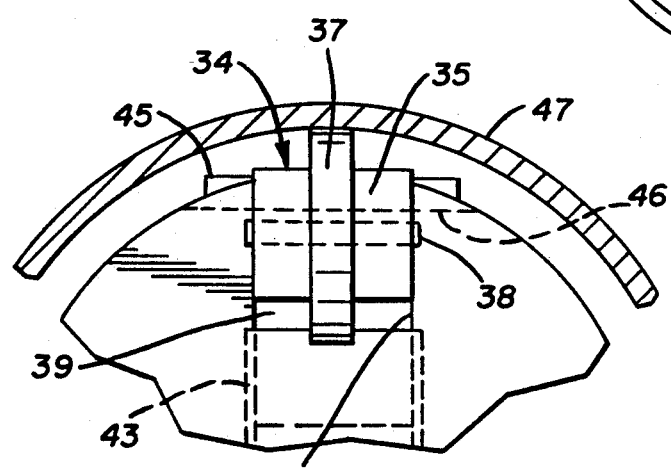

Referring to FIGS. 1 and 3 of the drawings a pipe cleaning apparatus 10 can be seen having a main support body 11 with a front surface 12, rear surface 13 and a continuous side wall 14. The main body has a central bore 15 extending therethrough and two overlapping annular recessed areas 16 and 17 extending inwardly from said rear surface 13, best seen in FIGS. 1 and 2 of the drawings. The recessed area 16 is centered over said central bore 15 extending therebeyond. A bushing 18 with its respective seals is positioned within the bore 15 inwardly from the rear surface 13 and flush with said front surface 12.

A fluid supply pipe 19 extends through the bushing 18 having a nozzle assembly 20 on one end and a transfer fitting assembly 21 on the other end thereof. Referring now to FIG. 1 of the drawings, the transfer assembly 21 has an outer housing and a support flange 22 that contains a threaded bore 23 and a rotating seal assembly 24. A high pressure fluid supply pipe and fitting 25 is positioned within the bore 23 and extends therefrom. The pipe and fitting 25 communicate with a source of fluid under high pressure (not shown) via a supply line 26.

The fluid support pipe 19 extends from the bushing 18 into the rotary seal assembly 24 in the transfer fitting assembly 21.

An air motor 27 having a drive gear 28 can be seen in FIG. 1 of the drawings secured to the support body 11 in the recess 17 adjacent the transfer fitting assembly 21. The drive gear 28 engages a gear 29 within the recess 16 secured to the supply pipe 19 and will rotate same upon actuation of the air motor 27. An air supply line 30 extends from said air motor 27 to a source of compressed air (not shown) as will be well understood by those skilled in the art.

Referring now to the nozzle assembly 20 shown in FIGS. 1 and 3 of the drawings, a nozzle manifold 31 is secured to and in communication with said fluid supply pipe 19. Annularly spaced multiple spray nozzles 32 extend from said nozzle manifold 31. Each of said nozzles 32 are angularly inclined in relation to saird manifold 31 and one another. An apertured lug 33 extends from said assembly 20 for pulling the pipe cleaning apparatus 10 as will be dicussed in more detail later.

Figure 6:
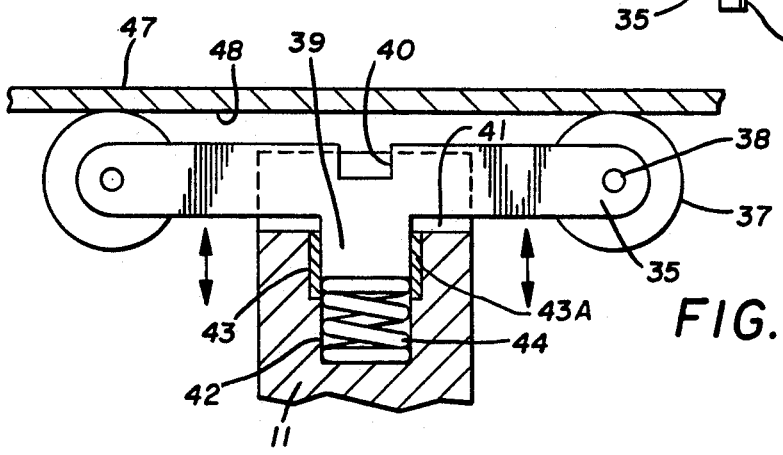
Figure 5:
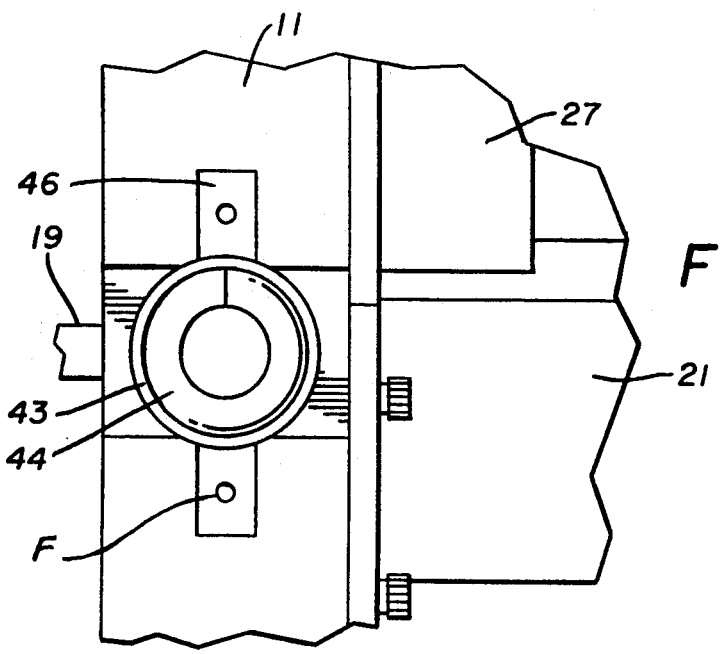

Referring to FIGS. 2 and 6 of the drawings, multiple guide wheel assemblies 34 can be seen extending from said continuous annular side wall 14 of said main support body 11. Each of said guide wheel assemblies 34 are comprised of a longitudinally extending support arm 35 slotted inwardly at 36 from its respective oppositely disposed ends. Wheels 37 are rotatably positioned within said respective slots 36 on pins 38. A cylindrical extension 39 extends outwardly from said support arm 35 midway therebetween. A retaining notch at 40 extends transversely across said arm 35 opposite said cylindrical extension 39. Each of the hereinbefore described wheel assemblies 34 are positioned within respective mounting slots 41 in the main support body member 11. Each of said slots 41 has a bore 42 extending partially into said main body member 11 at right angles to said slot.

Said bore 42 has an area of reduced diameter at 43 and a synthetic resin wear sleeve 43A positioned thereabove.

The cylindrical extension 39 of said arm 35 is resiliently positioned within said bore 42 by a spring 44. Each wheel asmebly 34 is held within said respective mounting slot 41 by a locking bar 45 extending through said retaining notch 40 and secured to said main body member 11 via fasteners F in oppositely disposed recess areas at 46.

The wheel assemblies 34 are equally spaced to one another around said body member 11 to form a multiple spaced area of support within a pipe 47.

In operation the pipe cleaning apparatus 10 is connected to a source of high pressure fluid via said supply line 26 and to said source of compressed air via said air supply line 30. The pipe cleaning apparatus is then positioned within the pipe 47 and secured to a pulling cable (not shown) by the apertured lug 33 rotatably secured to the nozzle assembly 20. As the device is slowly pulled through the pipe 47, the air motor 27 rotates the fluid supply pipe 19 and associated nozzle assembly 20. Fluid under ultra high pressure (10,000 lbs. per square inch) is supplied through the nozzles 32 with the effective inner pipe surface 48 being cleaned of residue and unwanted material associated with the particular pipe used.

The multiple wheel assemblies 34 track on the interior 48 of the pipe 47 keeping the pipe cleaning apparatus centered within and thus the nozzles 32 properly aligned as they rotate within the pipe.

Each wheel 37 of each independent wheel assembly 34 resiliently engages the inner surface of the pipe 48 at spaced points in front of and behind said respective front surface 12 and rear surface 13 of said main body support member 11 from which the nozzle assembly 20 extends and rotates.

This multiple spacing of each wheel 37 in relation to each other and said main body 11 will allow the pipe cleaning apparatus to accomodate curves and turns within the pipe as well as overcoming and compensating for uneven interior pipe surfaces.

Thus it will be seen that a new and useful pipe cleaning apparatus has been illustrated and described and that various changes and modifications may be made thereto without departing from the spirit of the invention, therefore I claim:

I claim:

1. An improvement in an internal pipe cleaning apparatus comprising a main support body, a multiple nozzle assembly extending therefrom, a plurality of nozzles in said nozzle assembly, means for rotating said nozzle assembly relative to said main support body, said improvement comprises guide and wheel assemblies resiliently mounted on said main body member, each of said guide and wheel assemblies comprising a bifurcated support arm having a cylindrical extension extending therefrom, a pair of wheels pivotally secured in spaced oppositely disposed relation to one another on said arm, a plurality of spaced mounting slots in said main body member for receiving said arms, each of said mounting slots having a central bore for registration with said cylindrical extension within, a spring positioned in each bore and means for resiliently securing said arm within said bore.

2. The improvement in a internal pipe cleaning apparatus of claim 1 wherein said nozzle assembly has a fluid supply and support pipe extending through said main support body in communication with a source of high pressure fluid, and wherein said means for rotating said nozzle assembly comprises an air motor secured to said main support body member engaging said fluid supply and support pipe.

3. The improvement in an internal pipe cleaning apparatus of claim 1 wherein said means for resiliently securing said arm within said bore comprises a locking bar within a notch in said arm and secured by fasteners to said main support body.

4. The improvement in an internal pipe cleaning apparatus of claim 1 wherein said bore has a wear sleeve positioned within adjacent an area of reduced diameter inwardly of said slot in said main support body member.

* * * * *